US00RE48053E

(19) United States
(12) Reissued Patent
Choi et al.

(10) Patent Number: US RE48,053 E
(45) Date of Reissued Patent: Jun. 16, 2020

(54) LIQUID CRYSTAL DISPLAY AND LED MODULE THEREOF

(71) Applicant: SAMSUNG ELECTRONICS CO., LTD., Suwon-si (KR)

(72) Inventors: Suk Ju Choi, Jeonju-si (KR); Kun Ho Cho, Suwon-si (KR); Yong Hun Kwon, Anyang-si (KR); Kye Hoon Lee, Suwon-si (KR); Gil Tae Hur, Suwon-si (KR); Young Min Lee, Bucheon-si (KR)

(73) Assignee: SAMSUNG ELECTRONICS CO., LTD., Suwon-si (KR)

(21) Appl. No.: 15/205,650

(22) Filed: Jul. 8, 2016

Related U.S. Patent Documents

Reissue of:
(64) Patent No.: 8,773,617
Issued: Jul. 8, 2014
Appl. No.: 13/418,925
Filed: Mar. 13, 2012

(30) Foreign Application Priority Data

Mar. 16, 2011 (KR) ..... 10-2011-0023402

(51) Int. Cl.
*G02F 1/1335* (2006.01)
*G02F 1/1333* (2006.01)
*F21V 8/00* (2006.01)

(52) U.S. Cl.
CPC ..... *G02F 1/133308* (2013.01); *G02B 6/0083* (2013.01); *G02B 6/009* (2013.01);
(Continued)

(58) Field of Classification Search
CPC .... G02B 6/009; G02B 6/0083; G02B 6/0031; G02F 1/133308
(Continued)

(56) References Cited

U.S. PATENT DOCUMENTS 7,284,894 B2 10/2007 Mok et al. ..... G02B 6/0031 362/612
7,894,016 B2 2/2011 Hamada ..... G02B 6/0068 349/58
(Continued)

FOREIGN PATENT DOCUMENTS

CN 101313243 A 11/2008
CN 101416101 A 4/2009
(Continued)

OTHER PUBLICATIONS

Communication dated Apr. 17, 2014, issued by the State Intellectual Property Office of People's Republic of China in counterpart Application No. 201210070114.4.
(Continued)

*Primary Examiner* — Henry N Tran
(74) *Attorney, Agent, or Firm* — Sughrue Mion, PLLC

(57) ABSTRACT

A liquid crystal display (LCD) includes a cover assembly; a liquid crystal panel; a light guide plate configured to guide light to the liquid crystal panel; a printed circuit board (PCB) to which the light guide plate is mounted; and a light emitting diode (LED) package which is mounted on the PCB and emits light to a lateral side of the light guide plate. The PCB includes a base substrate; a connecting hole which is formed in the base substrate to couple the base substrate to the cover assembly with a connecting member; an insulating layer which is coated on the base substrate while avoiding a head part of the connecting member; and a spacer tape which is provided on an upper side of the insulating layer so that the light guide plate is evenly mounted on the PCB.

34 Claims, 10 Drawing Sheets

(52) U.S. Cl.
CPC ..... *G02B 6/0031* (2013.01); *G02B 6/0068* (2013.01); *G02B 6/0073* (2013.01); *G02B 6/0085* (2013.01); *G02F 2001/13332* (2013.01); *G02F 2001/133314* (2013.01); *G02F 2001/133317* (2013.01); *G02F 2201/46* (2013.01)

(58) Field of Classification Search
USPC ..... 349/58, 62, 65, 67, 122, 138, 150; 362/97.2, 97.3, 612, 615, 621, 631–634
See application file for complete search history.

(56) References Cited

U.S. PATENT DOCUMENTS

| | | | | |
|---|---|---|---|---|
| 8,052,321 | B2 * | 11/2011 | Kim | F21K 9/00 362/249.02 |
| 8,100,573 | B2 * | 1/2012 | Kim | G02B 6/0068 362/609 |
| 8,164,704 | B2 | 4/2012 | Kim et al. | G02F 1/13454 349/161 |
| 8,358,387 | B2 | 1/2013 | Choi et al. | |
| 2009/0128732 | A1 | 5/2009 | Hamada | |
| 2009/0196070 | A1 | 8/2009 | Kim | |
| 2010/0110334 | A1 | 5/2010 | Oki et al. | |
| 2010/0123847 | A1 | 5/2010 | Jeong et al. | |
| 2010/0123851 | A1 | 5/2010 | Mo et al. | |
| 2010/0149834 | A1 | 6/2010 | Kim et al. | |

FOREIGN PATENT DOCUMENTS

| | | | |
|---|---|---|---|
| EP | 1 975 653 | A1 | 10/2008 |
| EP | 2 431 793 | A2 | 3/2012 |
| EP | 2 573 616 | A2 | 3/2013 |
| TW | 201027190 | A1 | 7/2010 |
| WO | 2007/129419 | A1 | 11/2007 |

OTHER PUBLICATIONS

Communication dated Dec. 1, 2014, issued by the State Intellectual Property Office of People's Republic of China in counterpart Application No. 201210070114.4.
Communication dated Jul. 12, 2017, issued by the State Intellectual Property Office of People's Republic of China in counterpart Application No. 201510367938.1.
Communication dated Apr. 27, 2015, issued by the State Intellectual Property Office of People's Republic of China in counterpart Application No. 201210070114.4.
Communication dated Mar. 27, 2018, issued by the State Intellectual Property Office of the People's Republic of China in counterpart Chinese Patent Application No. 201510367938.1.
Office Action dated Mar. 1, 2013, issued by the United States Patent and Trademark Office in U.S. Appl. No. 13/718,581.
Communication dated Jun. 19, 2012, issued by the European Patent Office in counterpart European Application No. 12158632.5.
Office Action dated Sep. 14, 2012, issued by the United States Patent and Trademark Office in U.S. Appl. No. 13/551,840.
Office Action dated Jun. 26, 2013, issued by the United States Patent and Trademark Office in U.S. Appl. No. 13/718,581.
Non-Final Rejection dated Sep. 14, 2012, issued by the United States Patent and Trademark Office in U.S. Appl. No. 13/551,840.
Communication dated Feb. 12, 2013, issued by the Korean Intellectual Property Office in counterpart Korean Application No. 10-2011-0023402.
Communication dated Jun. 18, 2013 issued by the European Patent Office in counterpart European Patent Application No. 13165625.8.

* cited by examiner

LIQUID CRYSTAL DISPLAY AND LED MODULE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This is a reissue application of U.S. Pat. No. 8,773,617, which was filed as U.S. patent application Ser. No. 13/418,925 on Mar. 13, 2012 and issued on Jul. 8, 2014, the disclosure of which is hereby incorporated by reference in its entirety.*

This application claims priority from Korean Patent Application No. 10-2011-0023402, filed on Mar. 16, 2011 in the Korean Intellectual Property Office, the disclosure of which is incorporated herein by reference in its entirety.

BACKGROUND

1. Field

Apparatuses and methods consistent with exemplary embodiments relate to a liquid crystal display (LCD), and more particularly, to an LCD including a light emitting diode (LED) module having an improved structure.

2. Description of the Related Art

An LCD is an electronic device configured to change electrical information generated by various devices into the visual information and to provide the visual information. The LCD requires a backlight due to the lack of the light emitting ability, but is widely used as a flat panel display because of low power consumption and superior portability.

The LCD uses a backlight unit as a light source for a liquid crystal that represents an image. The backlight unit is provided in variety of sizes and configurations, but in general, includes a lamp serving as a light source, an optical subsidiary member including a reflection sheet, a light guide plate, a diffusion sheet, a prism sheet and a protective sheet, and a mold frame serving as a support structure.

The light source is implemented using a cold cathode fluorescent lamp (CCFL), an external electrode fluorescent lamp (EEFL), an LED, etc.

In particular, a narrow bezel display having an LED as a light source has gathered a large amount of interest due to its differentiated design.

SUMMARY

Exemplary embodiments provide a structure of an LED module capable of implementing a super narrow bezel.

In accordance with an aspect of an exemplary embodiment, there is provided an LCD including a cover assembly, a liquid crystal panel, a light guide plate, a printed circuit board (PCB), and an LED. The light guide plate is configured to guide light to the liquid crystal panel. The light guide plate is mounted to the PCB. The LED package is mounted on the PCB and emits light to a lateral side of the light guide plate. The PCB includes a base substrate, a connecting hole, an insulating layer and a spacer taper. The connecting hole is formed in the base substrate to couple the base substrate to the cover assembly through a connecting member. The insulating layer is coated on the base substrate while avoiding a head part of the connecting member. The spacer tape is provided on an upper side of the insulating layer such that the light guide plate is evenly mounted on the PCB.

The connecting member may be coupled downward to the PCB from an upper side to a lower side of the PCB.

The cover assembly may include a top sash, a middle mold, and a bottom sash, wherein the PCB is coupled to the bottom sash.

The LED package may be provided in a side view type LED package that is mounted on one side of an upper surface of the PCB to emit light toward an opposite side of the upper surface of the PCB.

The LED package may include a lead terminal configured to receive power, and the PCB further comprises a lead terminal accommodating groove configured to accommodate the lead terminal.

The insulating layer may include photo solder resist (PSR).

The spacer tape may have a thickness substantially corresponding to a thickness of the head part of the connecting member.

The spacer taper may be provided on the upper side of the insulating layer except for an area corresponding to one end portion of the PCB.

An upper side of the insulating layer where the spacer tape is not provided may be coated with a black silk pattern.

The LCD may further include a connector protruding from a lower surface of the PCB to connect the PCB to an external power source.

The connector may be disposed at an edge of the PCB.

The LCD further may include a white tape provided on an upper side of the spacer tape while being disposed between the LED package and the light guide plate.

In accordance with an aspect of another exemplary embodiment, there is provided an LCD including a liquid crystal panel, a top sash, a light guide plate, an LED module, a bottom sash and a connecting member. The top sash includes a bezel configured to cover a rim of the liquid crystal panel. The light guide plate is configured to guide light to the liquid crystal panel. The LED module emits light to a lateral side of the light guide plate and supports the light guide plate such that the light guide plate is disposed at a position corresponding to an end portion of the bezel. The bottom sash is coupled to a lower side of the LED module to support the LED module. The connecting member is secured downward to couple the LED module to the bottom sash.

The LED module may further include a PCB and an LED package. The light guide plate may be mounted on the PCB. The PCB is coupled to the bottom sash. The LED package may be mounted on one side of an upper surface of the PCB to emit light toward an opposite side of the upper surface of the PCB.

The PCB may include a PSR coated for insulation. The PSR is coated while avoiding a head part of the connecting member.

A spacer tape may have a thickness substantially identical to a thickness of the head part of the connecting member is provided on the PCB.

In accordance with an aspect of another exemplary embodiment, there is provided an LED module including a PCB and an LED package. The LED package is provided in a side view type LED package that is mounted on one side of an upper surface of the PCB to emit light toward an opposite side of the upper surface of the PCB. The PCB includes a base substrate, a connecting hole, an insulating layer and a spacer tape. The connecting hole is formed through an upper surface and a lower surface of the base substrate to enable a connecting member to be coupled to the base substrate. The insulating layer is coated on the base substrate while being spaced apart outward from a circumference of the connecting hole by a predetermined distance. The spacer tape is provided on an upper side of the insulating layer to form a difference in steps around the connecting hole.

The LED module may further includes a lead terminal and a lead terminal accommodating groove. The lead terminal is formed on the LCD package to provide the LCD package with power. The lead terminal accommodating groove is formed in the PCB to accommodate the lead terminal.

The LED module may further includes a connector protruding from a lower surface of the PCB to connect the PCB to an external power source.

The LED module may further includes a white tape provided on an upper side of the spacer tape while being adjacent to the LED package.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Figure 1:
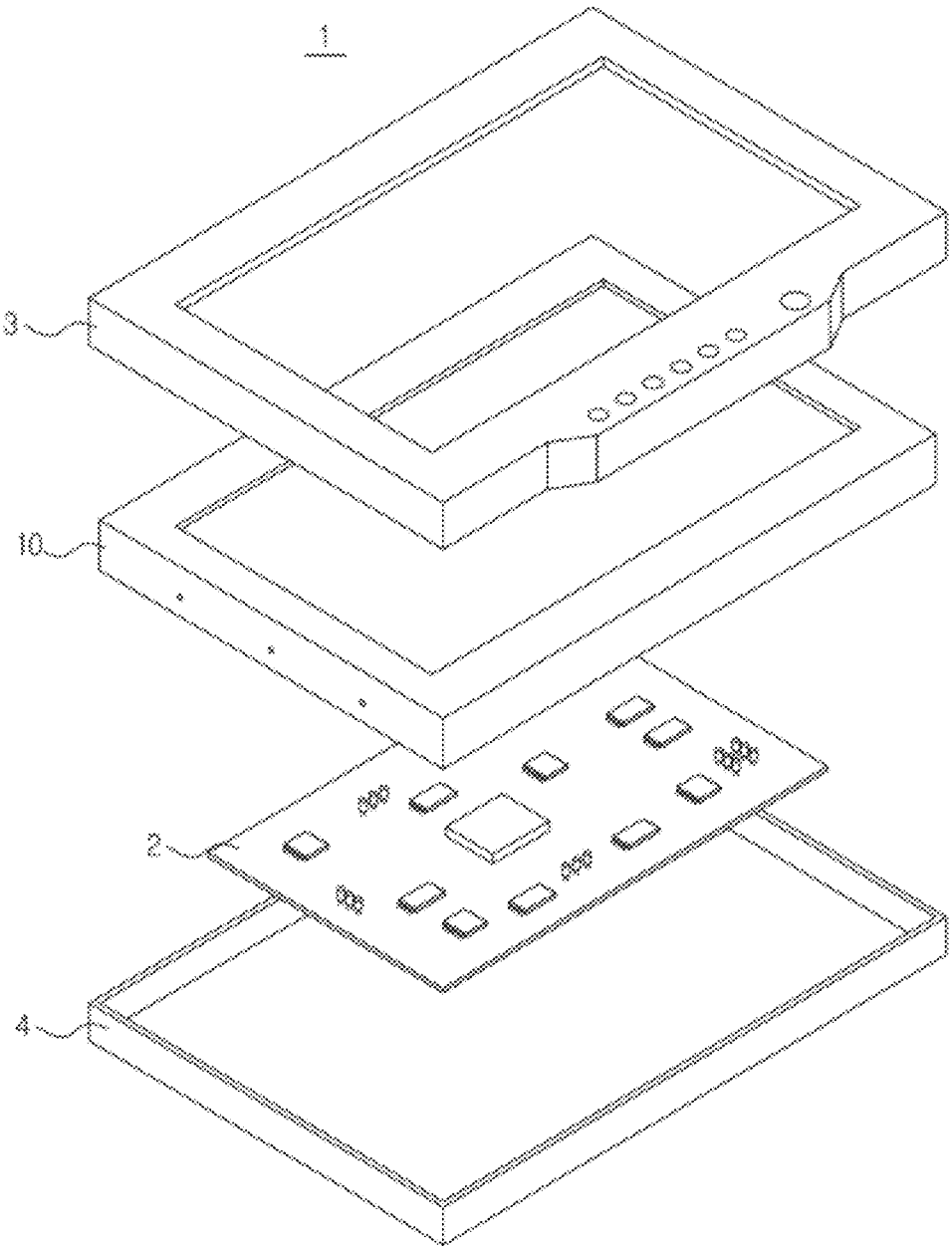
FIG. 1 is an exploded perspective view illustrating an LCD according to an exemplary embodiment.

Certain exemplary embodiments are described in detail below, with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the invention with unnecessary detail.

Figure 2:
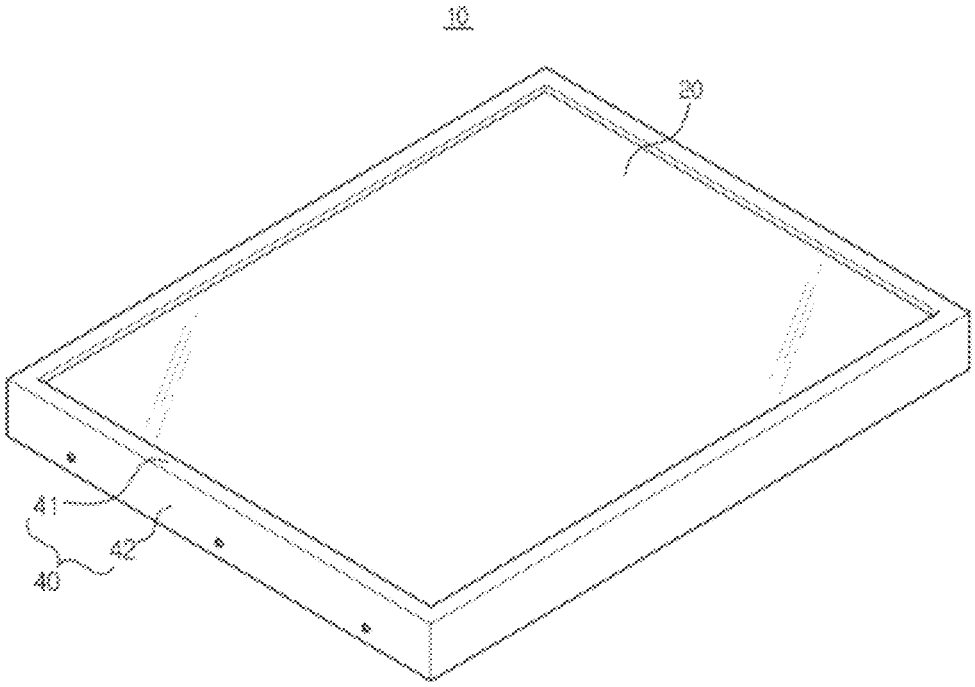
FIG. 2 is a perspective view illustrating a liquid crystal module of the LCD of FIG. 1.
Figure 3:
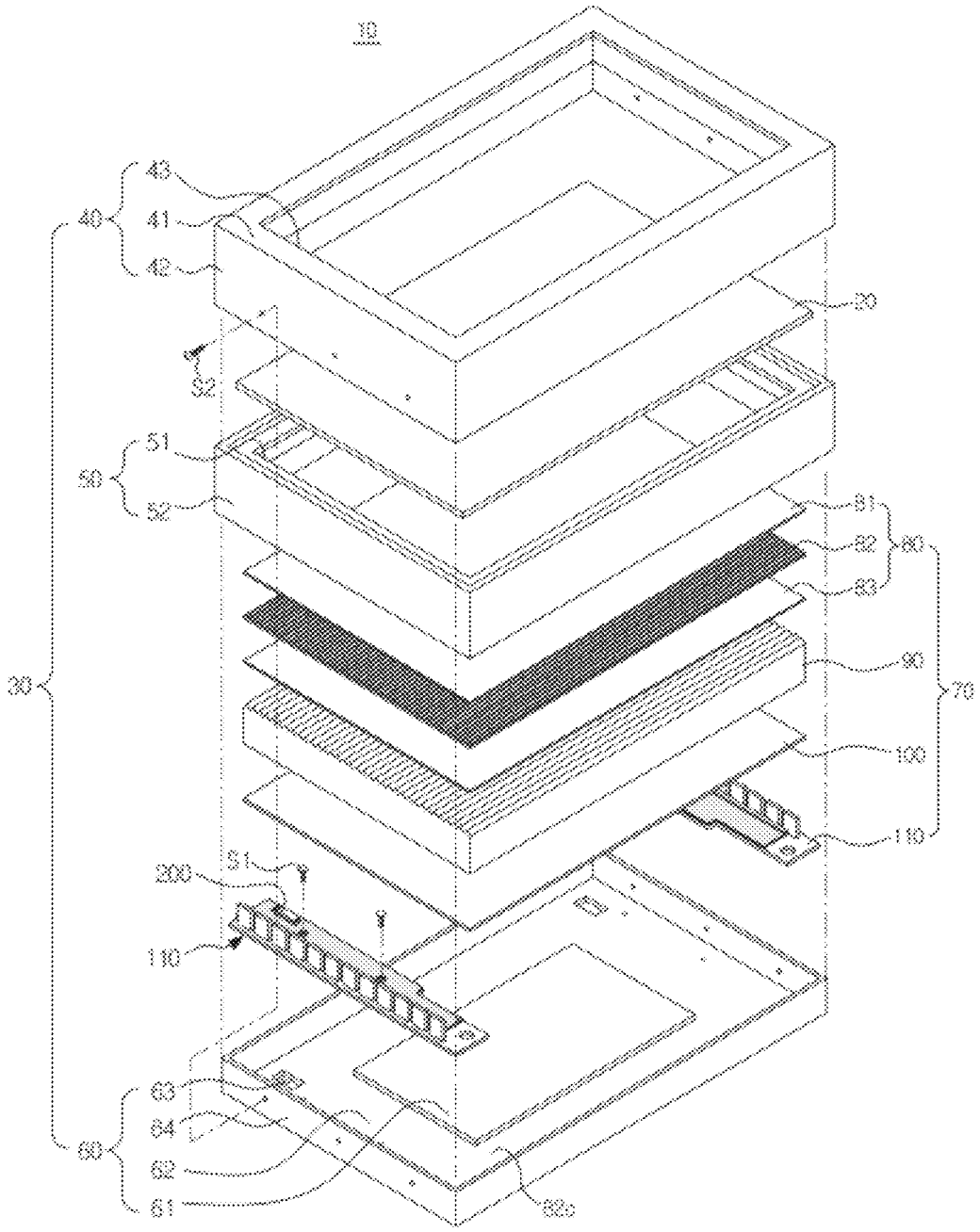
FIG. 3 is an exploded perspective view of the liquid crystal module of FIG. 2.
Figure 4:
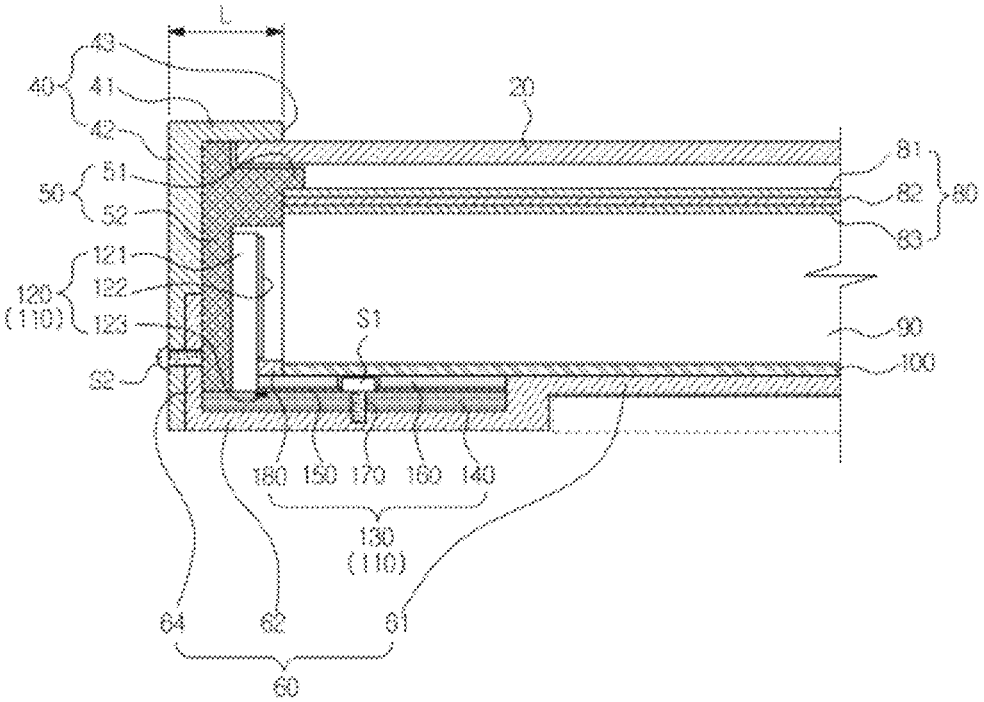
FIG. 4 is a cross-sectional view of the liquid crystal module of FIG. 2.

FIG. 1 is an exploded perspective view illustrating an LCD according to an exemplary embodiment. FIG. 2 is a perspective view illustrating a liquid crystal module of the LCD of FIG. 1. FIG. 3 is an exploded perspective view of the liquid crystal module of FIG. 2. FIG. 4 is a cross-sectional view of the liquid crystal module of FIG. 2.

Referring to FIGS. 1 to 4, an LCD 1 includes a front cover 3, a liquid crystal module 10, a main substrate 2, and a rear cover 4. The main substrate 2 operates the liquid crystal module 10 by applying signals to the liquid crystal module 10. The front cover 3 and the rear cover 4 are disposed on a front side and a rear side of the liquid crystal module 10, respectively, to cover and support the liquid crystal module 10 and the main substrate 2.

The liquid crystal module 10 includes a liquid crystal panel 20, a backlight unit 70, and a cover assembly 30 that covers and supports the liquid crystal panel 20 and the backlight unit 70.

The liquid crystal panel 20 corresponds to a display area of the liquid crystal module 10. Although not shown in the drawings, the liquid crystal panel 20 includes two thin glass substrates, liquid crystal molecules interposed between the two thin glass substrates, and a transparent electrode configured to apply a voltage to the liquid crystal molecules.

The backlight unit 70 is disposed on a lower side of the liquid crystal panel 20 to emit light to the liquid crystal panel 20, and includes an LED module 110, a reflection sheet 100, a light guide plate 90, and an optical sheet 80. It should be noted that the description of the components is illustrative only and is provided with reference to the drawings. Thus, the components which are described as upper or lower may be disposed on the front side of the display or on the rear side of the display, respectively, or vice versa.

The light guide plate 90 is provided in the form of a hexahedron, and includes acryl-based resin.

Various patterns are formed on a bottom surface of the light guide plate 90. Such a pattern frustrates the total reflection of light introduced to a lateral side of the light guide plate 90, so that the light is uniformly emitted through an upper surface of the light guide plate 90.

The reflection sheet 100 is provided on a lower side of the light guide plate 90 to reflect light, which travels downward after going through total reflection in the light guide plate 90, toward the light guide plate 90.

The optical sheet 80 includes a protective sheet 81, a prism sheet 82, and a diffusion sheet 83.

The diffusion sheet 83 is provided on an upper side of the light guide plate 90 such that light emitted through the upper surface of the light guide plate 90 is diffused and provided to the liquid crystal panel 20. The diffusion sheet 83 may be provided with a coating layer (not shown) having beads that diffuse light.

The prism sheet 82 is configured to collect light, which is diffused through the diffusion sheet 83, in a direction perpendicular to a display surface of the liquid crystal panel 20.

The protective sheet 81 is provided on an upper side of the prism sheet 82 to protect the prism sheet 82 susceptible to scratching due to dust.

The LED module 110 includes a PCB 130 and an LED package 120 mounted on the PCB 130, and emits light to the light guide plate 90. According to the current exemplary embodiment, a pair of LED modules 110 is disposed on a left side and a right side of the liquid crystal module 10 in symmetry to each other, but the configuration of the LED module 110 is not limited thereto. Alternatively, a pair of LED modules 110 may be disposed on an upper side and a lower side of the liquid crystal module 10. Alternatively, the LCD 1 may include only one LED module 110 provided on a lateral side of the liquid crystal module 10. The configuration of the LED module 110 is described in detail below.

The cover assembly 30 is configured to cover and support the liquid crystal panel 20 and the backlight unit 70, and includes a top sash 40, a middle mold 50, and a bottom sash 60.

The top sash 40 includes a bezel 41 forming a rim of the liquid crystal module 10, and a top lateral side wall 42. An end portion 43 of the bezel 41 is disposed perpendicular to a lateral side of the light guide plate 90 or a lateral side of the optical sheet 80.

The bezel 41 may be a super narrow bezel having a length (L) less than about 15 mm.

The bottom sash 60 includes a bottom part 61 to support the reflection sheet 100, the light guide plate 90 and the optical sheet 80, a substrate accommodating part 62 to accommodate the LED module 110, a bottom-lateral side wall 64, and a connector passing part 63 allowing a connector to pass therethrough.

The substrate accommodating part 62 is formed by recessing both end portions of the bottom part 61 to accommodate the LED module 110.

A connector 200 provided on a lower side of the LED module 110 is exposed to the outside of the liquid crystal module 10 by passing through the connector passing part 63.

The middle mold 50 includes a middle-lateral side wall 52 and a support part 51.

The middle-lateral side wall 52 has an upper side, which comes into close contact with the bezel 41 of the top sash 40, and a lower side, which comes into close contact with the PCB 130 of the LED module 110.

The support part 51 is disposed between the liquid crystal panel 20 and the optical sheet 80 such that the liquid crystal panel 20 is spaced apart from the optical sheet 80 by a predetermined distance. The support part 51 has an upper side, which comes into close contact with the liquid crystal panel 20, and a lower side, which comes into close contact with the optical sheet 80, to stably support the liquid crystal panel 20 and the optical sheet 80.

Such a configuration of the cover assembly 30 is assembled by coupling the top lateral side wall 42 of the top sash 40 to the bottom lateral side wall 64 of the bottom sash 60 with a second connecting member (S2).

Figure 5:
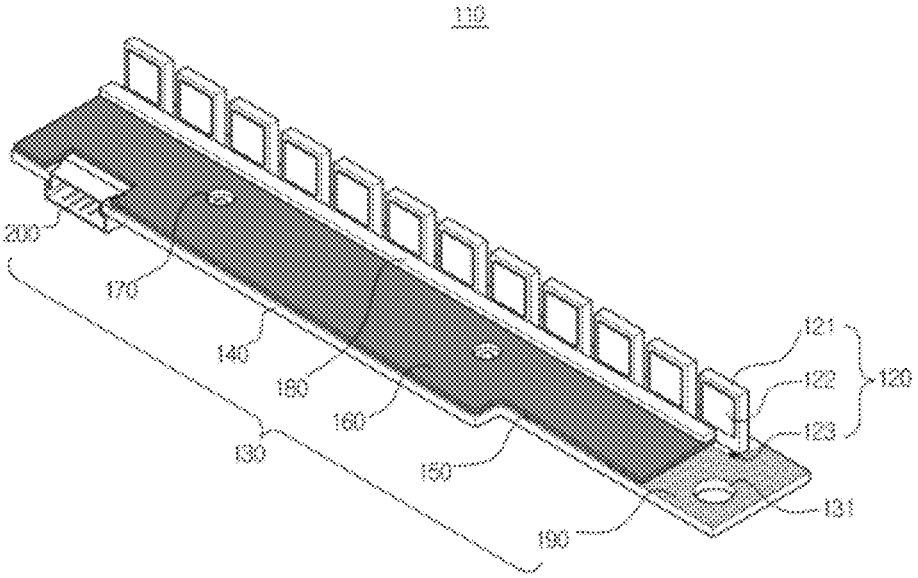
FIG. 5 is a perspective view of the LED module of FIG. 3.
Figure 6:
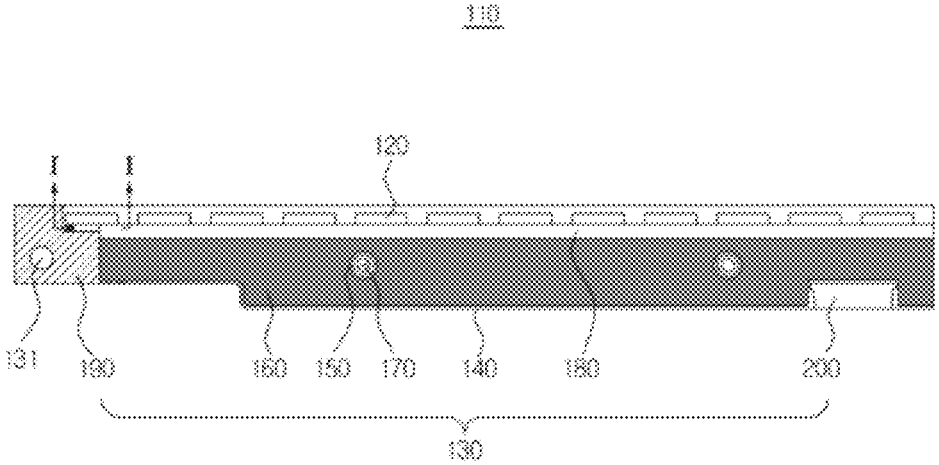
FIG. 6 is a top view of the LED module of FIG. 3.
Figure 7:
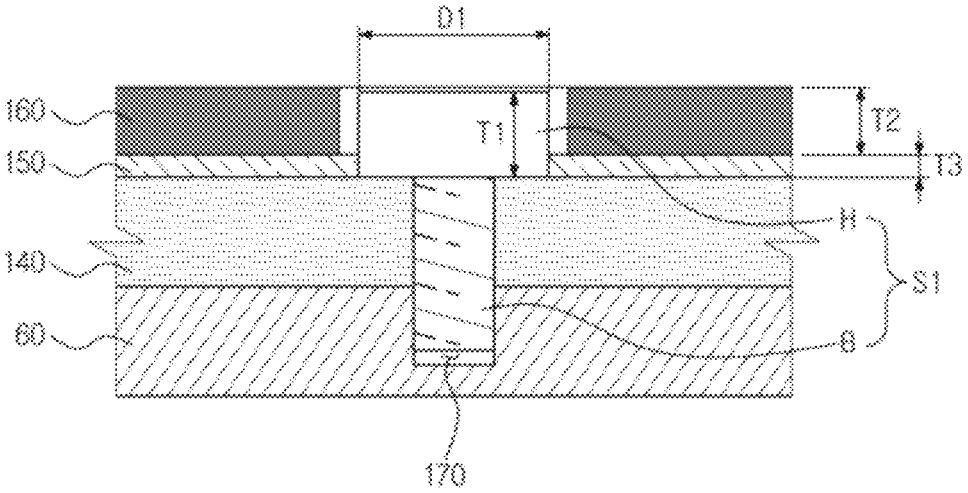
FIG. 7 is a cross-sectional view enlarging a portion of the LED module of FIG. 3.
Figure 8:
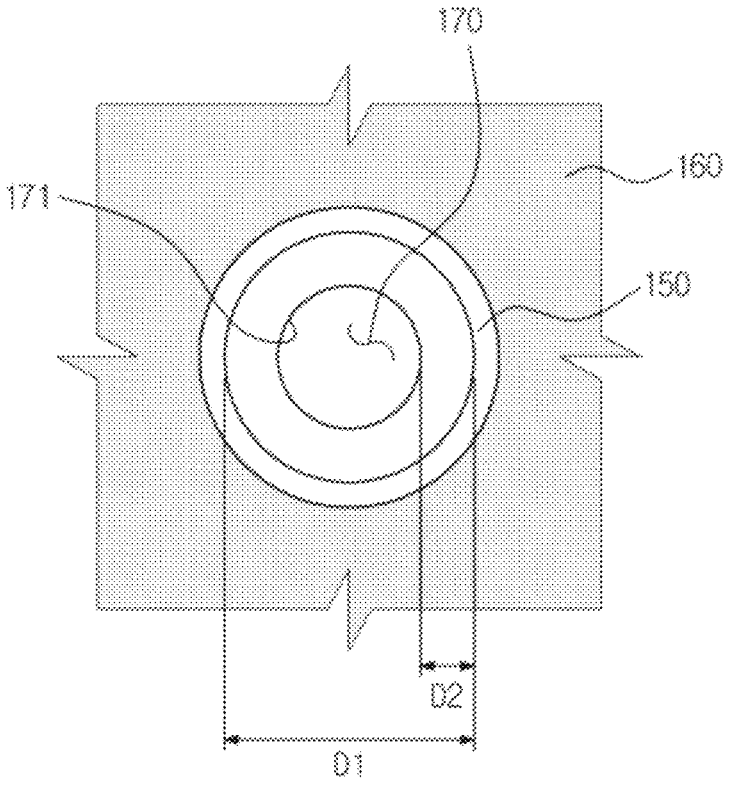
FIG. 8 is a top view enlarging a portion of the LED module of FIG. 3.
Figure 9:
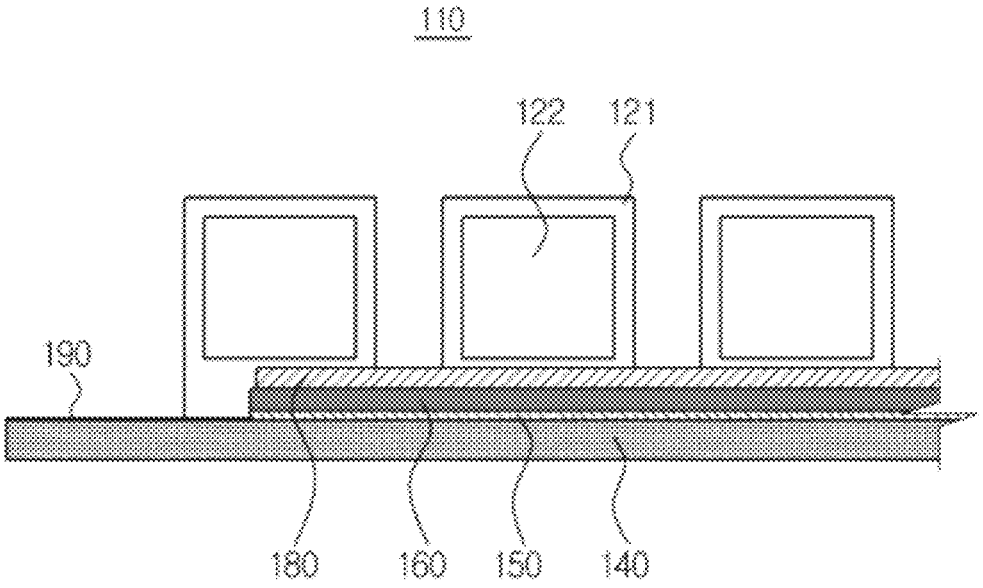
FIG. 9 is a side view of the LED module of FIG. 3.
Figure 10:
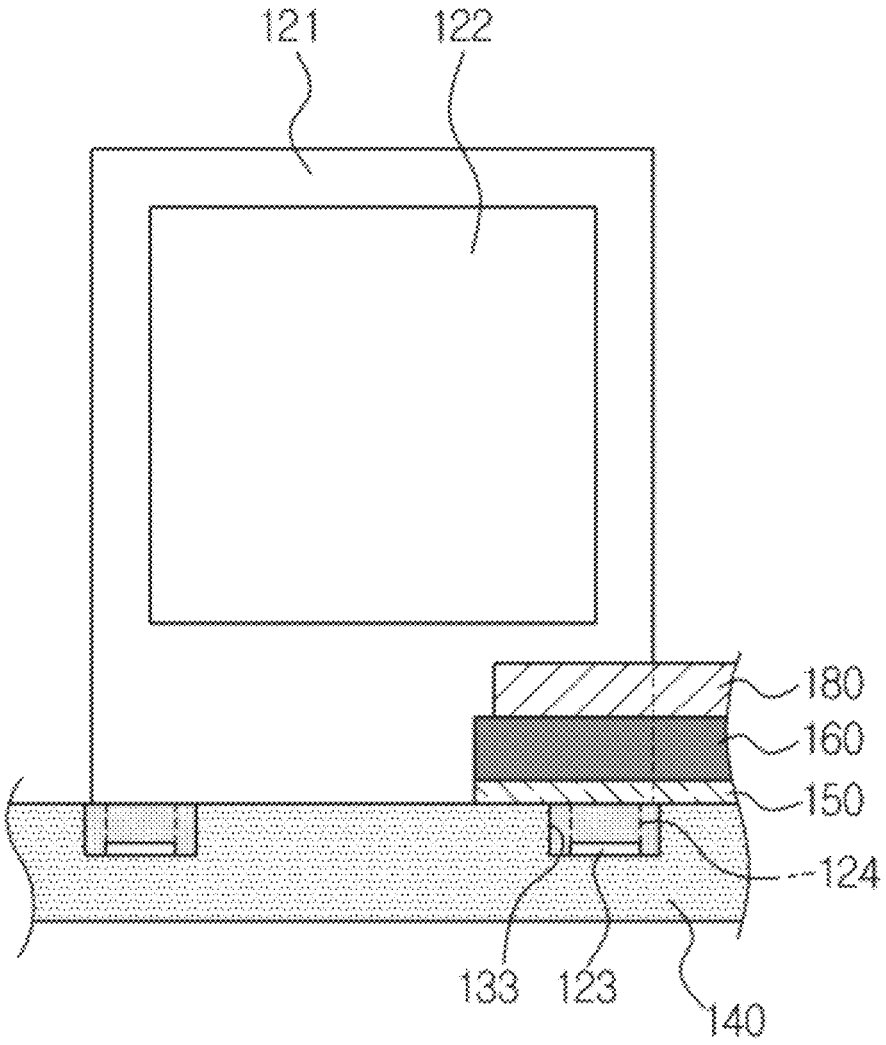
FIG. 10 is a cross-sectional view taken along line I-I of the LED module of FIG. 6.

FIG. 5 is a perspective view of the LED module of FIG. 3. FIG. 6 is a top view of the LED module of FIG. 3. FIG. 7 is a cross-sectional view enlarging a portion of the LED module of FIG. 3. FIG. 8 is a top view enlarging a portion of the LED module of FIG. 3. FIG. 9 is a side view of the LED module of FIG. 3. FIG. 10 is a cross-sectional view taken along line I-I of the LED module of FIG. 6.

The configuration of the LED module 110 is described below with reference to FIGS. 1 to 10.

The LED module 110 includes the PCB 130 to which the light guide plate 90 is mounted, and the LED package 120 mounted on an upper surface of the PCB 130.

In order to implement a super narrow bezel, the LED package 120 includes a side view type LED packages in which a light-emitting surface 122 is formed on a lateral side of a package body 121 of the LED package 120.

The liquid crystal module 10 uses a plurality of LED packages 120 that are mounted in line on one side of the upper surface of the PCB 130 to emit light to an opposite side of the upper surface of the PCB 130.

Referring to FIG. 10, a lead terminal 123 is formed on a leg part 124 extending downward from the package body 121 of the LED package 120 such that power is provided to the LED package 120. In addition, a lead terminal accommodating groove 133 is formed in the PCB 130 to accommodate the lead terminal 123 such that the lead terminal 123 is prevented from being exposed to the outside, thereby preventing the LED package 120 from causing a short circuit due to foreign substances having electric conductivity.

The PCB 130 includes a base substrate 140, an insulating layer 150 coated on the base substrate 140, a spacer tape 160 provided on an upper side of the insulting layer 150, a white tape 180 provided on an upper side of the spacer tape 160, a connecting hole 170 allowing the base substrate 140 to be coupled to the substrate accommodating part 62 of the bottom sash 60, and the connector 200.

The base substrate 140 is formed using metal such as aluminum. Accordingly, heat generated from the LED package 120 is rapidly transmitted through the base substrate 140 and heat exchange is generated with the outside or outdoor air. In addition, although not shown in the drawings, the base substrate 140 is patterned with a wire that is connected to the lead terminal 123 of the LED package 120 such that the driving signals are transmitted to each of the LED packages 120.

A first connecting member (S1) is inserted downward into the connecting hole 170 such that the base substrate 140 is coupled to the substrate accommodating part 62 of the bottom sash 60.

The first connecting member (S1) includes a body part (B) having a screw thread and a head part (H) provided on an upper side of the body part (B). Since the first connecting member (S1) is inserted downward into the connecting hole 170, the head part (H) is provided inside the liquid crystal module 10 without being exposed to the outside of the liquid crystal module 10.

The base substrate 140 is coated with the insulating layer 150 for electric insulation. The insulating layer 150 is formed using a white PSR.

The insulating layer 150 is coated while avoiding the head part (H) of the first connecting member (S1).

Referring to FIGS. 7 and 8, the insulating layer 150 is coated outside of a circular area having a diameter identical to that of a diameter (D1) of the head part (H). That is, the insulating layer 150 is coated on an area of the base substrate 140 while being spaced apart from a circumference 171 of the connecting hole 170 by a predetermined distance (D2). Accordingly, the head part (H) of the first connecting member (S1) comes into close contact with the base substrate 140.

Such a partial coating reduces a difference in steps caused by the head part (H) of the connecting member (S1) without an additional process.

Referring to FIG. 7, the spacer tape 160 is provided on the upper side of the insulating layer 150. The spacer tape 160 has a thickness (T2) substantially identical to a thickness (T1) of the head part (H) of the first connecting member (S1). Since a thickness (T3) of the insulting layer 150 is substantially less than the thickness (T2) of the spacer tape 160, the thickness (T1) of the head part (H) is regarded to be substantially identical to the thickness (T2) of the spacer tape 160.

The installation of the spacer tape 160 forms a difference in steps, which corresponds to the thickness (T1) of the head part (H) of the first connecting member (S1), around the connecting hole 170.

Accordingly, when the first connecting member (S1) is fastened to the connecting hole 170, the light guide plate 90 and the reflection sheet 100 are prevented from being slanted due to protruding of the head part (H) while maintaining a flat state.

In addition, the connector 200 is provided to protrude on a lower side of the PCB 130, thereby preventing the light guide plate 90 from being slantingly mounted on the PCB 130 due to the connector 200. Further, the connector 200 is disposed at an edge of the PCB 130 to improve the assembling efficiency of the LED module 110.

An end portion 190 of the PCB 130 has a hole 131 to which an additional connecting member is coupled such that the coupling force between the PCB 130 and the bottom sash 60 is improved. The forming of the hole 131 reduces an area of the end portion 190 of the PCB 130 and therefore the end portion 190 of the PCB 130 having the hole 131 is too small to have the spacer tape 160 attached to the PCB 130, and as a result the spacer tape 160 may be easily separated. Accordingly, the spacer tape 160 is not provided on the end portion 190 of the PCB 130 having the hole 131.

However, in order to prevent the liquid crystal panel 20 from having a light bouncing which is caused when the white PSR of the insulating layer 150 is exposed due to nonexistence of the spacer tape 160 on the end portion 190 of the PCB 130, a black silk pattern is coated on the end portion 190 of the PCB 130 which does not accompany the spacer tape 160.

In general, the coating of the silk pattern is performed to pattern a predetermined symbol on an upper side of the insulating layer 150. Accordingly, by performing such a general silk patterning on the end portion 190 which does not have the spacer tape 160, the light bouncing is prevented and a bright portion is reduced without an additional process.

A white tape 180 is provided on the upper side of the spacer tape 160 while being disposed between the LED package 120 and the light guide plate 90 to allow light emitted from the LED package 120 to be effectively introduced to the light guide plate 90. The white tape 180 improves 10% or more of light introduction efficiency.

As described above, a design differentiation is provided by implementing a super narrow bezel. In addition, this exemplary embodiment of a LCD and an LED module is implemented by using only a conventional process without an additional process, thereby enabling mass production.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A liquid crystal display (LCD) comprising:
- a cover assembly;
- a liquid crystal panel;
- a light guide plate configured to guide light to the liquid crystal panel;
- a printed circuit board (PCB) to which the light guide plate is mounted;
- a light emitting diode (LED) package which is mounted on the PCB and emits light to a lateral side of the light guide plate; and
- a connecting member,
- wherein the PCB comprises:
  - a base substrate having *an upper surface and* a connecting hole *extending from the upper surface*, the connecting member *having a head part disposed on the upper surface of the base substrate and a body* extending through the connecting hole to couple the base substrate to the cover assembly;
  - an insulating layer which is coated on [an] *the* upper surface of the base substrate [while avoiding a head part of the connecting member disposed on the upper surface of the base substrate]; and
  - a spacer tape which is provided on an upper side of the insulating layer so that the light guide plate is evenly mounted on the PCB.

2. The LCD of claim 1, wherein the connecting member is coupled downward to the PCB from an upper side to a lower side of the PCB.

3. The LCD of claim 1, wherein the cover assembly comprises:
- a top sash,
- a middle mold, and
- a bottom sash,
- wherein the PCB is coupled to the bottom sash.

4. The LCD of claim 1, wherein the LED package comprises a side view LED package that is mounted on one side of an upper surface of the PCB to emit light toward an opposite side of the upper surface of the PCB.

5. The LCD of claim 1, wherein the LED package comprises a lead terminal configured to receive power, and
- the PCB further comprises a lead terminal accommodating groove configured to accommodate the lead terminal.

6. The LCD of claim 1, wherein the insulating layer comprises photo solder resist.

7. The LCD of claim 1, wherein the spacer tape has a thickness substantially equal to a thickness of the head part of the connecting member.

8. The LCD of claim 1, wherein the spacer tape is provided on the upper side of the insulating layer except for an area corresponding to one of end portions of the PCB.

9. The LCD of claim 8, wherein the upper side of the insulating layer, where the spacer tape is not provided, is coated with a black silk pattern.

10. The LCD of claim 1, wherein the PCB further comprises a connector protruding from a lower surface of the PCB to connect the PCB to an external power source.

11. The LCD of claim 10, wherein the connector is disposed at an edge of the PCB.

12. The LCD of claim 1, wherein a white tape is provided on an upper side of the spacer tape while being disposed between the LED package and the light guide plate.

13. A liquid crystal display (LCD) comprising:
- a liquid crystal panel;
- a top sash comprising a bezel configured to cover a rim of the liquid crystal panel;
- a light guide plate configured to guide light to the liquid crystal panel;
- a light emitting diode (LED) module which emits light to a lateral side surface of the light guide plate and supports the light guide plate so that the lateral side surface of the light guide plate is disposed at a position substantially coinciding with a position of an end edge of the bezel, [as seen] in a direction from the bezel to the light guide plate;
- a bottom sash coupled to a lower side of the LED module to support the LED module; and
- a connecting member that couples the LED module to the bottom sash.

14. The LCD of claim 13, wherein the LED module comprises:
- a printed circuit board (PCB) to which the light guide plate is mounted and coupled to the bottom sash; and
- an LED package mounted on one side of an upper surface of the PCB to emit light toward an opposite side of the upper surface of the PCB.

15. The LCD of claim 14, wherein the PCB comprises a photo solder resist (PSR) coated for insulation, and the PSR is coated while avoiding a head part of the connecting member.

16. The LCD of claim 14, wherein a spacer tape having a thickness substantially equal to a thickness of athe head part of the connecting member is provided on the PCB.

17. A light emitting diode (LED) module comprising:

a printed circuit board (PCB);

an LED package comprising a side view LED package that is mounted on one side of an upper surface of the PCB to emit light toward an opposite side of the upper surface of the PCB; and a connecting member, wherein the PCB comprises:

a base substrate;

a connecting hole which is formed through an upper surface and a lower surface of the base substrate and through which the connecting member is coupled to the base substrate;

an insulating layer which is coated on the base substrate while being spaced apart outward from a circumference of the connecting hole by a predetermined distance; and a spacer tape provided on an upper side of the insulating layer to form a difference in steps around the connecting hole.

18. The LED module of claim 17, wherein a lead terminal is formed on the LED package to provide the LED package with power; and a lead terminal accommodating groove is formed in the PCB to accommodate the lead terminal.

19. The LED module of claim 17, wherein the PCB further comprises a connector protruding from a lower surface of the PCB to connect the PCB to an external power source.

20. The LED module of claim 17, wherein the PCB further comprises a white tape provided on an upper side of the spacer tape while being adjacent to the LED package.

21. A liquid crystal module assembly comprising:

a liquid crystal panel;

a cover assembly comprising a bezel configured to cover a rim of the liquid crystal panel;

a light guide plate configured to guide light to the liquid crystal panel; and a light emitting diode (LED) module which emits light to a lateral surface of the light guide plate and supports the light guide plate so that the lateral surface of the light guide plate is disposed at a position substantially coinciding with a position of an end edge of the bezel, [as seen] in a direction from the bezel to the light guide plate, the LED module comprising:

a plurality of LED packages, and a printed circuit board (PCB) to which the light guide plate and the *plurality of* LED packages are mounted, the PCB comprising a base substrate, and a connecting hole which is formed in the base substrate to couple the base substrate to the cover assembly.

22. The liquid crystal module assembly of claim 21, wherein the cover assembly comprises:

a top sash which houses the bezel and the liquid crystal panel;

a middle mold configured to be inserted into the top sash into a close proximity to the bezel and to support the liquid crystal panel;

a bottom sash configured to be inserted into the top sash and to support the LED module;

a first connecting member configured to be inserted into the top sash and the bottom sash to secure the top sash and the bottom sash to one another; and a second connecting member configured to be inserted from an upper surface of the PCB into the connecting hole, to couple the LED module to the bottom sash.

23. The liquid crystal module assembly of claim 22, wherein the bottom sash comprises:

a bottom part which supports the light guide plate;

a substrate accommodating part which is recessed as compared to the bottom part and configured to house the LED module; and a connector opening formed in the substrate accommodating part.

24. The liquid crystal module assembly of claim 23, wherein the PCB further comprises:

an electrical insulating layer coated on the upper surface of the PCB while excluding an area in contact with a top part of the second connecting member;

a spacer tape which is provided on the electrical insulating layer and configured to create a step so that a top surface of the PCB becomes even with the bottom part to evenly support the light guide plate; and an electrical connector configured to protrude outside of the LED module through the connector opening in the bottom sash.

*25. A display apparatus comprising:*

*a cover assembly;*

*a liquid crystal panel;*

*a light guide plate configured to guide light to the liquid crystal panel; and*

*a printed circuit board (PCB) on which a light emitting diode (LED) package is mounted, the LED package being configured to emit light to a lateral side of the light guide plate;*

*wherein the PCB comprises:*

*a connector located underneath the light guide plate;*

*a base substrate having a connecting hole through which a connecting member extends to couple the base substrate to the cover assembly, wherein the connecting member has a head part disposed on an upper surface of the base substrate;*

*an insulating layer which is provided on the upper surface of the base substrate; and*

*a spacer tape which is provided on an upper side of the insulating layer.*

*26. The display apparatus of claim 25, wherein the LED package is mounted substantially perpendicular to the PCB.*

*27. The display apparatus of claim 25, wherein the LED package is mounted standing on the PCB.*

*28. The display apparatus of claim 25, wherein the spacer tape is provided on the upper side of the insulating layer so that the light guide plate is evenly disposed on the PCB.*

*29. The display apparatus of claim 25, wherein the connector is configured to receive electrical signals for driving the LED package.*

*30. A display apparatus comprising:*

*a cover assembly;*

*a liquid crystal panel;*

*a light guide plate configured to guide light to the liquid crystal panel;*

*a printed circuit board (PCB) including a base substrate and a connector mounted to the base substrate, the base substrate having a connecting hole;*

*a light emitting diode (LED) package which is mounted substantially perpendicular to the PCB and emits light to a lateral side of the light guide plate;*

*an insulating layer which is provided on an upper surface of the base substrate; and*

*a connecting member extending through the connecting hole to couple the base substrate to the cover assembly and having a head part disposed proximate to the LED package on the upper surface of the base substrate and a body extending through the connecting hole toward a lower surface of the base substrate, wherein the lower surface is distal to the LED package and opposes the upper surface,*

*wherein the connector is located underneath the light guide plate.*

*31. The display apparatus of claim 30, wherein the connector is configured to receive electrical signals for driving the LED package.*

*32. The display apparatus of claim 30, wherein a spacer tape is provided on an upper side of the insulating layer.*

*33. The display apparatus of claim 30, wherein a spacer tape is provided on an upper side of the insulating layer so that the light guide plate is evenly disposed on the PCB.*

*34. The display apparatus of claim 30, wherein the head part is disposed between the upper surface of the base substrate and the light guide plate.*

* * * * *